April 3, 1928.  1,665,027
J. H. HALEY
MOLD FOR FORMING CONCRETE PLANT PROTECTORS
Filed May 17, 1927
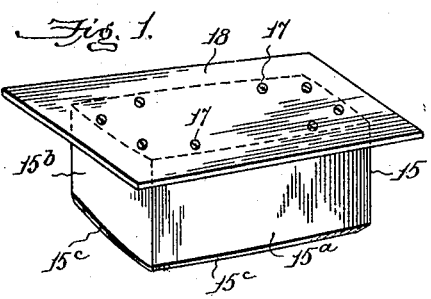
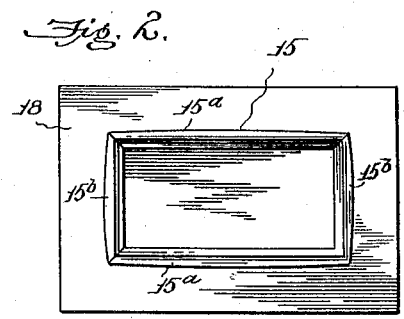
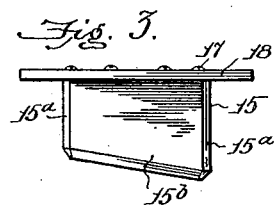
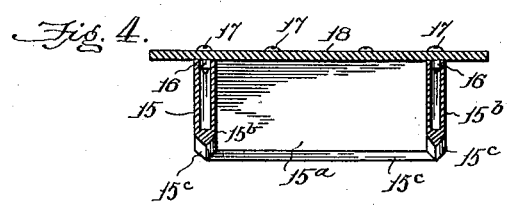
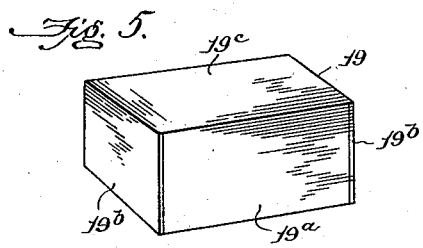
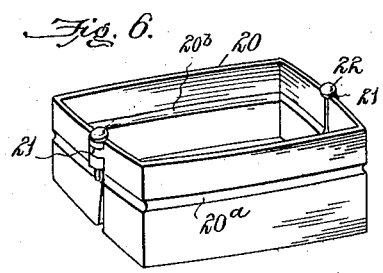
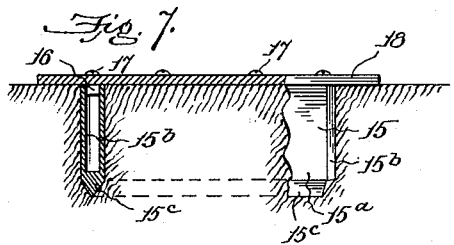
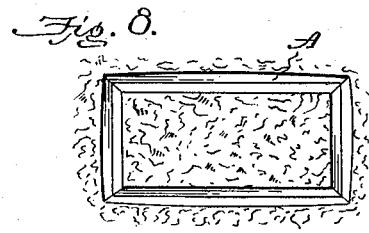
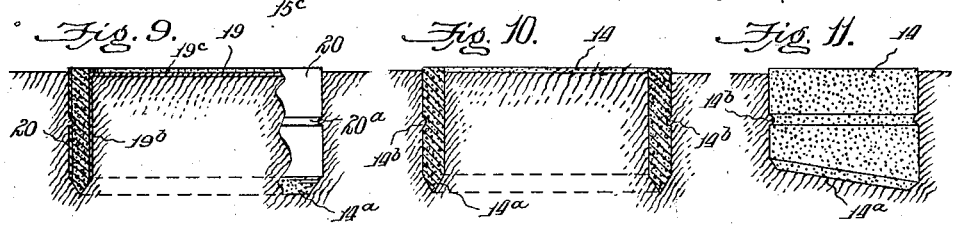
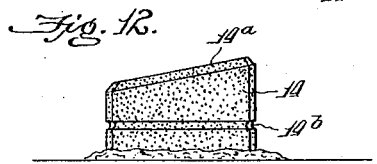
James H. Haley.
INVENTOR
BY John B Thomas Co
ATTORNEYS.

Patented Apr. 3, 1928.

1,665,027

UNITED STATES PATENT OFFICE.

JAMES H. HALEY, OF JACKSON, MICHIGAN.

MOLD FOR FORMING CONCRETE PLANT PROTECTORS.

Application filed May 17, 1927. Serial No. 192,013.

My invention is an improvement in plant-protectors, and relates more especially to devices of this kind which are made of concrete and rest upon the ground to shield growing plants from wind and weather.

The primary object of my invention is to facilitate the construction of concrete plant-protectors by forming them in the ground, where they will be protected from rain and weather during the process of hardening, and for this purpose I provide a particular form of mold that is forced into the ground to receive the concrete mixture and give the desired shape to the plant-protector that is permitted to remain in the ground until it becomes hard.

A further object of my invention is to provide a mold for the purpose stated that may be withdrawn after the plant-protector has been shaped in the ground and immediately used for forming another, and so on, whereby in the practice of my invention any number of plant-protectors may be formed at a considerable saving in time and labor.

Other objects and advantages of my invention will hereinafter appear, and what I claim as new and desire to protect by Letters Patent is more specifically set forth in the appended claims.

In the accompanying drawings:

Figure 1 is a perspective view of the main part of my improved mold for forming concrete plant-protectors.

Fig. 2 is an inverted plan view thereof.

Fig. 3 is an end view.

Fig. 4 is a longitudinal sectional view.

Fig. 5 is a perspective view of one of the linings forming a part of the mold.

Fig. 6 is a perspective view of a companion lining.

Fig. 7 is a sectional view showing the main part of the mold embedded in the ground to form the opening which receives the linings and concrete mixture.

Fig. 8 is a plan view illustrating the opening formed in the ground by the main part of the mold.

Fig. 9 is a view, partly in section, showing the linings in place.

Fig. 10 shows the concrete plant-protector formed in the ground.

Fig. 11 is an end view of the concrete plant-protector in the ground, and

Fig. 12 shows the concrete plant-protector removed from the ground and set in place for protecting plants.

As hereinbefore stated my invention contemplates an arrangement or mold by means of which concrete plant-protectors may be formed or constructed in the ground instead of making them in the usual manner, and to this end I provide in the first place a mold or former 15 of a desired shape corresponding with the shape of concrete plant-protector to be produced, as in the example shown consisting of side walls $15^a$ $15^a$ and end walls $15^b$ $15^b$ to form a rectangular plant-protector, the said mold or former being provided with a top plate 18 by which it is handled in forcing the same into the ground and which will also serve to pack the top soil to prevent dirt from falling into the opening when the mold or former is withdrawn, and consequently said top plate is extended beyond the side and end walls as shown in the drawings. To facilitate the operation of forcing the mold or former into the ground the lower edges of the side and end walls are beveled in opposite directions, as at $15^c$, providing an entering edge, and to form a plant-protector of the shape shown in Fig. 12, with an inclined top, one of the side walls is shorter than the other and the connecting end walls are inclined at their lower edges; furthermore, the outer faces of these side and end walls are slightly bulged while their inner faces are straight—the groove $14^b$ in the plant-protector 14 (Fig. 12) being formed by one of the linings hereinafter referred to while the beveled upper edge $14^a$ is formed by the correspondingly beveled lower edges of the side and end walls of the mold or former 15. The top plate 18 is secured in place by screws 17, and when the body of the mold is made by casting lugs 16 are provided to receive said screws, but it will be understood that the top plate may be formed integrally with the body portion, that is the mold or former 15 may be a single casting although I prefer the construction shown and described, the purpose being to form a hole A in the ground as shown in Fig. 8 in which the concrete mixture may be poured to form the plant-protector in the ground.

In order to protect the sides of the opening A during the pouring of the soft concrete mixture into the same, so that the inner and outer surfaces of the concrete plant-protector will have a smooth finish, I provide sheet metal linings 19 and 20, the lining 19 being box-shaped so that the sides $19^a$ and ends 19$^b$ will fit against the inner side of the rectangular opening A, while the lining 20 is in the form of a rectangular frame to fit against the outer side of said opening in the ground, and consequently the sides and ends of said lining 20 are curved outward corresponding with the curvature of the outer wall of the opening formed by the aforesaid mold or former 15. The inner lining is provided with a top 19$^c$ which rests upon the ground in between the rectangular opening, and the outer lining 20 may project to a more or less extent above the ground, this arrangement not only providing that the top of the inner lining will prevent dirt from falling into the opening from this quarter but will form a surface on which the concrete mixture may be deposited preliminary to filling the opening between the linings, and the projecting upper end of the outer lining will prevent dirt falling in from the outer side of the opening. The outer lining may be formed to give any desired contour to the outer side of the concrete plant-protector to be produced, as for instance it may be provided with a groove or crease 20$^a$ to form a ridge 20$^b$ at the inner side thereof which will result in forming groove 14$^b$ in the finished product.

The outer lining 20 is preferably made in two sections, as shown in Fig. 6 of the drawings, for convenience in removing said lining after the concrete is poured, the companion sections being connected by hinge joint 21 and removable pintle 22 preferably at the center of the opposite ends of the frame forming the lining.

From the foregoing description in connection with the accompanying drawings the operation of forming a concrete plant-protector in the ground will be readily understood, for after the opening, as A, is formed by forcing the mold or former 15 into the ground and removing the same the linings 19 and 20 are inserted to rest against the opposite walls of the opening and then the concrete mixture is poured into the opening between said linings thus forming the concrete plant-protector of the desired shape. Immediately after the concrete is poured and becomes set the linings are removed leaving the concrete in the hole to harden, and of course the mold may be used at once in making another concrete plant-protector. In removing the outer lining 20 having the ridge 20$^b$ at its inner side to form the groove 14$^b$ in the plant-protector the pintles 22 are first removed and the two sections of said lining then withdrawn, the flexibility of the sheet metal coupled with the yielding nature of the soil permitting said sections to be removed without destroying the groove; however, in practice it may be desirable to locate the aforesaid ridge nearer the upper edge of said outer lining than shown in the drawings. The operation, effected by means of the mold devices described, not only expedites the formation of concrete plant-protectors, at a saving in time and labor, but also results in the concrete being permitted to harden gradually to prevent cracking, and it is also protected against wind and weather.

In forming the concrete plant-protectors they may be formed or produced at the places where they are to be used in protecting plants, but of course in this instance they would be formed before they are required in protecting the plants. However, they may be formed in the ground at any time and place suitable for the work, and may be used any number of times; it being understood that after being formed in the ground they are removed and turned over so that the straight end rests on the ground and the inclined upper end positioned as usual so that the plants will receive the sunlight and be protected from the wind.

The particular form of the concrete plant-protector is not such an essential part of my invention, the main feature of which is providing an arrangement for forming a concrete plant-protector in the ground to attain the advantages hereinbefore set forth, and consequently my invention contemplates modifications or changes within the spirit and scope of the appended claims.

I claim:—

1. Means for forming a concrete plant-protector in the ground comprising a mold of a shape to correspond approximately with the shape of plant-protector to be produced and having a plate to pack the top surface of the ground around the opening formed by the mold.

2. Means for forming a concrete plant-protector in the ground comprising a mold having side and end pieces with bulged outer surfaces and straight inner surfaces, and a plate attached to the mold to project beyond the same.

3. Means for forming a concrete plant-protector in the ground comprising a mold having side and end pieces beveled at their lower edges, and a plate at the upper end of the mold to project beyond the sides of the same.

4. Means for forming a concrete plant-protector in the ground comprising a mold of a shape to correspond approximately with the shape of the plant-protector to be produced and having its lower end beveled in opposite directions to provide entering edges, and a plate at the upper end of the mold to pack the top soil around the opening formed thereby.

5. Means for forming a concrete plant-protector in the ground comprising a mold of a shape to correspond approximately with the shape of plant-protector to be produced, and sheet metal linings for the opposite side walls of the opening formed by the mold and between which the concrete mixture is poured.

6. Means for forming a concrete plant-protector in the ground comprising a mold of a shape to correspond approximately with the shape of plant-protector to be produced and having a plate at its upper end to pack the soil around the opening formed by said mold, and sheet metal linings for the opposite side walls of the opening formed by the mold and between which the concrete is poured.

7. Means for forming a concrete plant-protector in the ground comprising a mold of a shape to correspond approximately with the shape of the plant-protector to be produced and having a plate at its upper end to pack the soil around the opening formed by said mold, a sheet metal lining for the inner wall of the opening formed by the mold, and a two-part sheet metal lining for the outer wall of said opening.

8. Means for forming a concrete plant-protector in the ground comprising a mold of a shape to correspond approximately with the shape of the plant-protector to be produced and having a plate at its upper end to pack the soil around the opening formed by said mold, a sheet metal lining for the inner wall of the opening formed by the mold, and a sheet metal lining for the outer wall of said opening consisting of two sections hinged together by removable pintles.

9. Means for forming a concrete plant-protector in the ground comprising a mold of a shape to correspond approximately with the shape of plant-protector to be produced and having a plate at its upper end to pack the soil around the opening formed by said mold, and a sheet metal lining for the outer wall of the opening in the ground and embossed to produce a corresponding surface on the concrete plant-protector.

10. Means for forming a concrete plant-protector in the ground comprising a mold having side and end pieces with one of the end pieces shorter than the other and the connecting side pieces inclined from one end piece to the other at the lower end of the mold, and a plate at the upper end of the mold to pack the soil around the opening in the ground formed thereby; together with a lining for the inner wall of the opening having a connecting top resting on the ground within the opening, and a sheet metal lining for the outer wall of the opening formed in two sections connected by hinges with removable pintles.

JAMES H. HALEY.